United States Patent

Ichikawa et al.

[15] 3,656,133

[45] Apr. 11, 1972

[54] DATA INFORMATION SIGNAL GENERATOR

[72] Inventors: Kiyoshi Ichikawa, Takamatsu-shi; Akira Fujioka, Tokyo-to, both of Japan

[73] Assignee: Kabushiki Kaisha Hitachi Susakusho

[22] Filed: July 16, 1969

[21] Appl. No.: 842,263

[30] Foreign Application Priority Data

July 17, 1968 Japan....................................43/50299

[52] U.S. Cl................................340/207, 340/357, 340/204, 310/25, 331/156

[51] Int. Cl............................................................G08c 19/16

[58] Field of Search..............340/207, 191, 345 C, 203, 345; 310/8.2, 8.1, 25; 73/70.2; 331/156, 116 M; 235/61.11 C; 179/90 K

[56] References Cited

UNITED STATES PATENTS

| | | | |
|---|---|---|---|
| 1,806,871 | 5/1931 | Bower | 340/191 |
| 2,867,798 | 1/1959 | Coquelet | 340/359 |
| 2,323,719 | 7/1943 | Mallina | 179/90 K |
| 2,854,542 | 9/1958 | Boysen, Jr. et al | 340/345 |
| 3,449,736 | 6/1969 | Little | 340/203 |

*Primary Examiner*—John W. Caldwell
*Assistant Examiner*—Robert J. Mooney
*Attorney*—Robert E. Burns and Emmanuel J. Lobato

[57] ABSTRACT

A data information signal generator comprises a plurality of vibrating reeds each mounted to undergo free oscillation, a rotating body having notched portions around it to impart free oscillation to the reeds, another rotating body having around its peripheral surface a plurality of projections to selectively prevent the free oscillation of certain ones of the reeds in accordance with variations in physical quantities, and a detector. to detect the existence or non-existence of the free oscillation of the reeds.

14 Claims, 15 Drawing Figures

DATA INFORMATION SIGNAL GENERATOR

This invention relates to a data information signal generator, and, more particularly, to an apparatus for generating data information signals capable of converting physical quantities such as amount of consumption of electricity, water, gas, etc. into electrical quantities.

Heretofore, the amount of consumption of these supplies was indicated on watt-hour meters, gas meters, or water meters, etc. installed in each of the houses, buildings, etc. and the meters were periodically inspected by inspecting staffs of the suppliers. The inspected data was then later converted by keypunchers into input data for electronic computers whereupon the computation of fees with respect to the consumed amount of supplies or production control of these supplies at the suppliers side are carried out.

In such a conventional method of control, however, a great deal of labor and considerably long time is spent inspecting meters or gauges as well as converting the inspected data into input data for the computers. Also, there may be human errors introduced in the course of these processes. The abovementioned disadvantages can be overcome if an automatic gauge inspection telemetering system is provided which is capable of converting the physical quantities of consumption of these supplies at each home into electrical signals whereby these data signals may be processed by a centralized computer system. However, such a telemetering technique, which has already been reduced to practice in the field of data communication, is extremely limited in its utility from the economical standpoint, hence a device which can be installed at each home in a simple manner at a low cost is still beyond reach.

It is therefore a primary object of the present invention to provide a data information signal generator of simple construction and low cost.

It is another object of the present invention to provide a data information signal generator of high fidelity and capable of codifying various physical quantities in a simple manner.

In order to attain the abovementioned objects, the data information signal generator according to the present invention comprises a plurality of vibrating reeds which perform free vibration at a vibrating frequency proper to each of the vibrating reeds, means to impart free oscillation to each of the plurality of reeds, means to selectively prevent the free oscillation of the respective vibrating reeds in accordance with vibrations in physical quantities to be measured, and means to detect existence or non-existence of free oscillation in each of the vibrating reeds.

The foregoing objects and other objects of the present invention will become more apparent from the following detailed description of the invention when read in conjunction with the accompanying drawing, in which like parts are designated by like reference numerals and characters, and in which.

Figure 5:
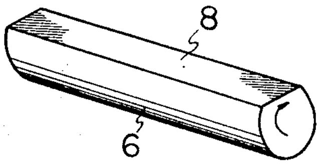
Figure 6:
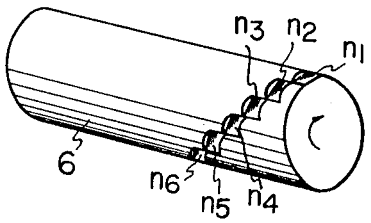
Figure 7:
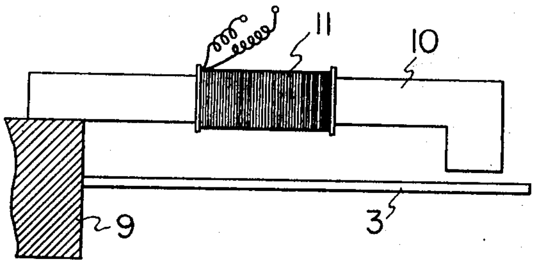

FIGS. 4(*a*) through 4(*i*) respectively indicate the positional relationship of the control rotor with respect to the vibrating reeds;

FIGS. 5 and 6 are respectively other embodiments of the control rotor according to the present invention; and FIG. 7 is a further embodiment of imparting free oscillation to the vibrating reeds by the use of an electro-magnet.

The basic principle of the present invention resides in utilization of the phenomenon that free oscillation of a resilient vibrating reed is suppressed by slightly contacting the vibrating reed with another object. Thus, by selectively controlling the sequence of free oscillations of a plurality of vibrating reeds in accordance with changes in physical quantities, the physical quantities are detected as digital information signals.

Figure 1:
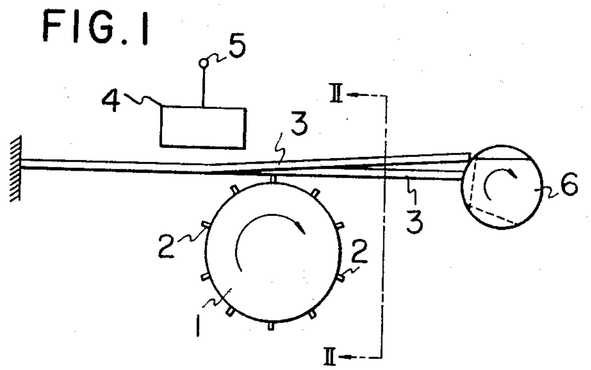
FIG. 1 is a schematic side view showing a construction of one embodiment of the present invention.

Referring now to FIG. 1, a embodiment of the data information generator of this invention comprises a rotor 1 which rotates around its axis in proportion to and as a function of some physical quantity such as, for example, electric power consumption, on the peripheral surface of which are provided a plurality of projections 2, each representing a codified quantity corresponding to a preselected rotational angle of the rotor with respect to a reference angle. A plurality of vibrating reeds 3, each having a mutually different oscillation frequency and performing free oscillation independently of the others, are divided into groups 3A, 3B and 3C, each group being composed of five individual reeds each of which is connected at one end to a stationary support. The reeds are selectively oscillated and their oscillation is selectively suppressed when they are brought in contact with respective ones of the projections 2 disposed on the rotor surface. A detector 4 is disposed to detect free oscillation of the reeds and convert the oscillatory movement into an electrical signal, the detector having an output terminal 5; and a control rotor 6 is provided to give angular displacement to the respective vibrating reeds, to supply energy of the free oscillation, and simultaneously to control the timing for subjecting the reeds to free oscillation.

Figure 2:
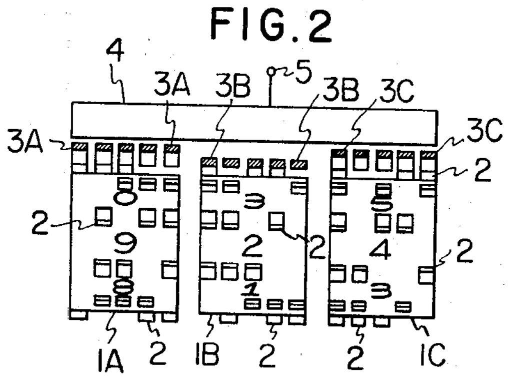
FIG. 2 is a front view, partly in section, of the device according to this invention shown in FIG. 1 taken along the line II—II.

The positional relationship between the vibrating reeds 3 and the projections 2 on the peripheral surface of the rotor 1 is more clearly shown in FIG. 2 which is a front view, partly in section, of the device shown in FIG. 1 taken along the line II—II. In the drawing, the reference letters 1A, 1B, and 1C respectively designate rotors which count a three-figure numerical value, as one example, in which the rotor 1A sequentially counts 0, 1, 2, . . . and, when it performs one rotation, the rotor 1B advances by one count; also, when the rotor 1B completes its one rotation, the rotor 1C advances by one count. Further, each of the rotors is provided with a mechanism for codifying data corresponding to the rotational angle thereof by means of two-out-of-five-code system. In other words, at the peripheral surface of the respective rotors 1A, 1B and 1C, there are provided a plurality of projections 2, in which numerals 0 to 9 are codified in accordance with the two-out-of-five-code system. Of the five vibrating reeds 3A each having a different oscillation frequency and disposed in confrontation to the rotor 1A, only two reeds oscillate freely at any time and the other three reeds have their free oscillation suppressed by the projections 2. The other rotors 1B and 1C function in a similar manner. Thus, the codified numerical value indicated around the peripheral parts of the rotors 1A, 1B, and 1C are converted into a corresponding free oscillation of the reeds.

Figure 3:
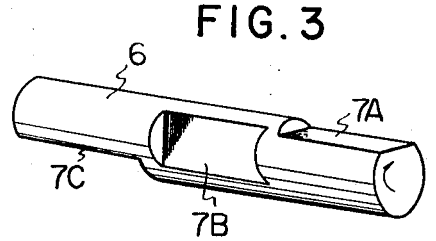
FIG. 3 is a perspective view of one embodiment of a control rotor according to the present invention.
Figures 4A, 4D, 4G:
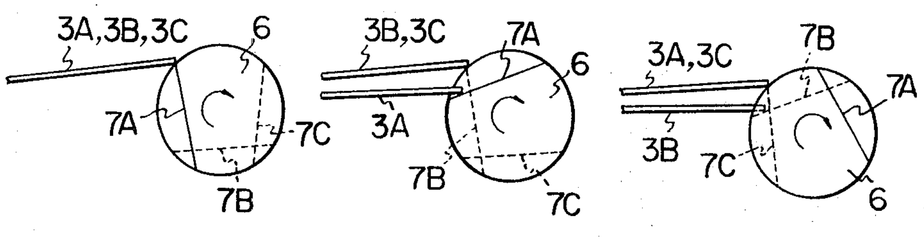
Figure 4B:
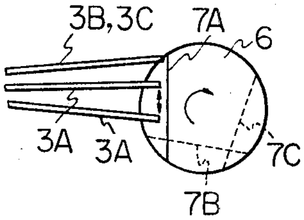
Figure 4E:
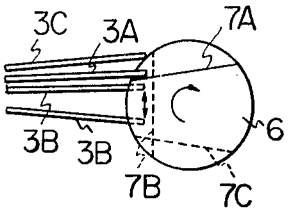
Figure 4H:
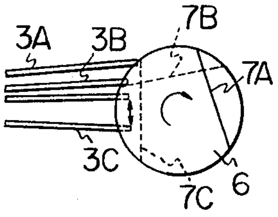
Figure 4C:
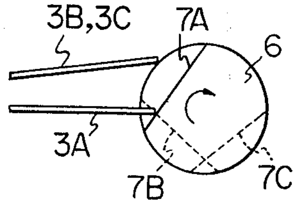
Figure 4F:
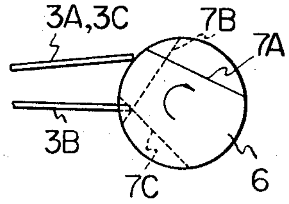
Figure 4I:
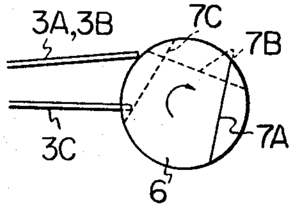

The free oscillation of the reeds is caused by the control rotor 6, one example of which is shown in FIG. 3. As seen from the perspective view, the control rotor 6 is provided with control surfaces comprising notches 7A, 7B and 7C at different positions thereon and in response to rotation of the control rotor 6 in a direction of the arrow mark, the reeds 3A, 3B, and 3C are sequentially given free oscillation.

The free oscillation of the reeds will now be described in more detail hereinbelow with reference to FIGS. 4(*a*) to 4(*i*).

First of all, prior to actuation of the data information signal generator, the groups of vibrating reeds 3A, 3B and 3C are respectively in contact with an arcuate portion of the control rotor 6 and are subjected to positional displacement thereby, as shown in FIG. 4(*a*). From this state, when the control rotor 6 slightly rotates in the direction of the arrow mark to assume a position as shown in FIG. 4(*b*), the reeds 3A are brought out of contact with and released from the notch 7A of the rotor whereby the reeds 3A perform free oscillation with an oscillation frequency proper to each of the reeds. In this case, however, the three vibrating reeds 3A which contact the projections 2 provided on the peripheral surface of the rotor 1 are prevented from undergoing free oscillation. When the control rotor 6 further rotates to assume a position as shown in FIG. 4(*c*), the vibrating reeds 3A in free oscillation are forced to stop their oscillations due to their contact with the notch 7A, and the reeds 3A begin once again to be displaced in response to further rotation of the control rotor 6 as indicated in FIG. 4(*d*).

Next, when the control rotor 6 assumes a position as shown in FIG. 4(*e*), the reeds 3B are released from contact with the notch 7B whereby the reeds perform free oscillation with an oscillation frequency proper to each reed. However, the vibration of the three reeds 3B in contact with the projections provided on the rotor 1B is effectively suppressed by the projections 2 and the remaining two reeds alone undergo free oscillation. For instance, in the state shown in FIG. 2, the second and fifth reeds of the group 3B, counting from the left side of the rotor 1B, oscillate freely, so that a numeral "4" is codified in terms of a binary code of "01001". When the control rotor 6 further rotates to assume its position as shown in FIG. 4(*f*), the reeds 3A return to their initial positions, and the reeds 3B are forced to stop their oscillation by coming into contact with the notch 7B and the reeds 3B are then subjected to gradual displacement back to their initial starting position as shown in FIG. 4(*g*). Upon further rotation of the control rotor 6 as shown in FIG. 4(*h*), two of the reeds 3C commence free oscillation while the other three reeds are prevented from oscillating and are controlled by the rotor 1C in accordance with the above-discussed principles. When the control rotor 6 further rotates to assume a position as shown in FIG. 4(*i*), the free oscillation of the oscillating reeds within the group 3C is stopped forcibly. Further rotation of the control rotor 6 completes one cycle of rotation, and the rotor returns to its original position as shown in FIG. 4(*a*).

As is apparent from the foregoing description, one complete rotation of the control rotor 6 causes a plurality of reeds at each figure to perform free oscillation in a sequential order, and the free oscillation of the reeds are controlled by the rotors 1A, 1B, and 1C and are detected by the detector 4. In this case, by differentiating or varying the intrinsic oscillation frequency in each of the five reeds at each figure, it becomes possible to sequentially detect the numerical values of the respective figures in accordance with the multi-frequency signal by the two-out-of-five-code system and provide a corresponding output signal. The detector 4 can be of any well-known type that is capable of detecting accurately the existence or non-existence of oscillation of each reed such as, for example, an acoustic type, optical type, or electrical type. If accurate detection of the oscillation is definitely warranted, the oscillation frequency of each reed needs not always be varied from one to another. One of the most useful types of detector is a detecting coil, in which each of the reeds is made of a magnetic materials and variation in magnetic flux due to difference in the vibration frequency is converted to an a.c. output signal by magnetic induction.

By the abovementioned construction and operation of the data information signal generator according to the present invention, a physical quantity, such as power consumption, etc. can be converted into a digital signal by the two-out-of-five-code system which appears as an electrical output signal at the output terminal 5. Accordingly, if a driving source is provided for the control rotor 6 in such a manner that it can be operated by a centralized control station, it becomes readily possible to collect physical quantities, such as the consumed amount of electricity, gas, and water supplies at each home, in the form of digital signals by actuating the data information signal generator at a required time from the control station whereupon the output codified signals are processed by electronic computers.

In the above-described example, the technique of codifying a numerical value of three figures by the two-out-of-five-code system has been explained for the sake of simplicity. However, it goes without saying that the number of figures can be increased, and that codification systems other than the "two-out-of-five-code system" may be employed. Also, if the intrinsic or natural oscillation frequency of each of the plurality of reeds is made different one from the other, it is possible to cause all the reeds to oscillate simultaneously and to obtain multi-frequency signals of all the figures at once. In this case, a control rotor 6 as shown in FIG. 5 is used. This rotor 6, unlike the control rotor shown in FIG. 3, is provided with a notch 8 at one portion thereof throughout the entire length of the rotor in its axial direction, whereby all the vibrating reeds are simultaneously subjected to free oscillation.

Also, as shown in FIG. 6, if a plurality of notches are provided on the peripheral surface of the control rotor 6 in staggered sequence and at different positions such as $n_1$, $n_2$, $n_3$ . . ., each of these notches imparting free oscillation to one vibrating reed corresponding thereto, it will be possible to obtain digital signals from the rotors 1A, 1B, and 1C as time-sequential on-off signals by rotation of the control rotor 6. In this case, the intrinsic oscillation frequency of the respective reeds may be the same.

In each of the foregoing examples, mechanical displacement of the vibrating reeds due to rotation of the control rotor 6 is adopted as a means for imparting thereto the necessary free oscillation. However, this free oscillation of the reeds can also be effected by an electrical expedient.

FIG. 7 shows a principal part of one embodiment to impart free oscillation to the reeds by using an electro-magnet. In this example, the reed 3 is made of a magnetic material, one end of which is fixed to a base 9 of a magnetic material and the other end of which is left free. The base 9 is further provided with an arm 10 also composed of a magnetic material, on one part of which a coil 11 controlled by actuating signals from a central control station is provided. When a d.c. voltage is applied to the coil 11, the arm 10 of the magnetic material is magnetized, whereby the free end of the reed 3 is attracted to the arm and displaced from its original position. When the application of the d.c. voltage is interrupted, the free end of the reed 3 is released whereupon the reed oscillates at its intrinsic oscillation frequency. By repetition of this on-off operation, and varying the intrinsic oscillation frequency of each of the plurality of reeds, digital signals of the entire figures can be detected simultaneously as multi-frequency signals.

As has been described in detail, the data information signal generator of the present invention is simple in construction and extremely economical, hence it has various advantages such that unit of this apparatus can be easily installed at each home (consumer), the physical quantities of the consumed supplies can be accurately converted into oscillation of the reeds in direct manner by means of a codification system, the converted data informations being taken out as electrical signals, which reduces the number of conversion steps as well as possibility of errors in the course of such conversion operation to a considerable degree, and installation of the apparatus would save time and labor of inspecting staffs making gage inspection tours as well as data processing step by key-punchers. Thus the data information signal generator of the present invention is remarkably effective in its realization of the automatic gauge inspection telemetering system.

What we claim is:

1. A data information signal generator comprising: a plurality of vibratory reeds each having one end fixed to a base structure and the other end free to undergo free oscillation; means to impart free oscillation of each of said plurality of reeds in response to a command signal from a central control station; means engageable with said vibrating reeds to selectively halt their oscillation including rotors angularly displaceable in proportion to a physical quantity to be measured, and projections on said rotors engageable with said reeds to halt their oscillation; and detecting means for detecting the existence and non-existence of the free oscillation of each of said reeds.

2. A data information signal generator comprising: a plurality of vibratory reeds made of magnetic material each having an intrinsic oscillation frequency different from the others and being mounted to undergo free oscillation; means to impart free oscillation to said plurality of reeds in response to a command signal from a central control station; means to control the oscillation of said reeds including at least one rotor having means thereon for indicating a physical quantity to be measured in response to angular displacement of said rotor and a plurality of projections representative of codified physical quantities disposed on the peripheral surface of said rotor to alternatively contact with or be separated from said reeds during angular displacement of said rotor; and means for magnetically detecting the existence and non-existence of free oscillations of said plurality of vibratory reeds in response to a variation of the magnetic flux density caused by the oscillating reeds.

3. Apparatus according to claim 1, wherein said means to impart free oscillation comprises a cylindrical rotor having on the peripheral surface thereof means defining notches releasably engageable with respective ones of said vibratory reeds, said notches being formed at different angular positions on said rotor to sequentially impart the free oscillation to said reeds in response to rotation of said rotor.

4. Apparatus according to claim 2, wherein said means to impart free oscillation to said vibratory reeds comprises a cylindrical rotating body having a single notch provided on one peripheral surface part of the rotating body and extending in the axial direction thereof.

5. Apparatus according to claim 2, wherein said means to impart free oscillation to said vibratory reeds comprises an electro-magnet which attracts and releases said reeds to cause them to vibrate.

6. Apparatus according to claim 1, in which said plurality of vibratory reeds are made of a magnetic material, and wherein said detecting means comprises a pick-up coil for detecting magnetic flux developed during oscillation of said reeds and providing a corresponding electrical signal.

7. A signal generating apparatus for providing electrical signals representative of the consumption of a physical quantity comprising: mechanical signal generating means angularly displaceable as a function of the consumption of a physical quantity to a plurality of different angular signaling positions for providing when in each angular signaling position at least one group of individual mechanical signals collectively representative of a different amount of the physical quantity whose consumption is to be determined, said mechanical signal generating means comprising at least one rotor having disposed thereon a plurality of circumferentially spaced-apart groups of projections, each group of projections being disposed on said rotor at one of said angular signaling positions in an array different from that of the projections in the other groups and representative of an amount of the physical quantity consumed; and signal converting means for periodically converting at least one group of said individual mechanical signals into corresponding electrical output signals representative of the consumption of the physical quantity, said signal converting means comprising at least one group of vibratory members, means mounting said vibratory members for vibrational movement along respective vibratory paths and including means locating said vibratory members relative to said rotor for effecting direct contact between predetermined pairs of said projections and vibratory members whenever said rotor is in one of said angular signaling positions thereby temporarily preventing the contacted vibratory members from undergoing further vibrational movement, actuating means for periodically imparting vibrational movement to those vibratory members not in contact with respective ones of said projections, and detecting means for detecting both the vibrational movement of the vibrating vibratory members not in direct contact with any of said projections and the absence of vibrational movement of the vibratory members in direct contact with some of said projections and providing corresponding electrical output signals.

8. An apparatus according to claim 7; wherein said mechanical signal generating means comprises a plurality of alike rotors; and wherein said signal converting means comprises a plurality of alike groups of vibratory members each cooperative with one of said rotors to provide a separate group of electrical output signals cumulatively representative of the consumption of the physical quantity.

9. An apparatus according to claim 8; wherein said actuating means comprises means for periodically and sequentially imparting vibrational movement to each said group of said plurality of groups of vibratory members.

10. An apparatus according to claim 7; wherein said actuating means comprises means for simultaneously imparting vibrational movement to said vibratory members within each said group of vibratory members.

11. An apparatus according to claim 10; wherein said actuating means includes a rotatable shaft having means thereon defining a planar surface portion simultaneously engageable with and then disengageable from all said vibratory members in response to rotation of said shaft to impart vibrational movement to said vibratory members.

12. An apparatus according to claim 7; wherein said actuating means comprises means for sequentially imparting vibrational movement to said vibratory members within each said group of vibratory members.

13. An apparatus according to claim 12; wherein said actuating means includes a rotatable shaft having means thereon defining a plurality of staggered surface portions each sequentially engageable with and then disengageable from successive ones of said vibratory members in response to rotation of said shaft to sequentially impart vibrational movement to said vibratory members.

14. An apparatus according to claim 7; wherein said vibratory members are composed of magnetic material; and wherein said actuating means comprises electromagnetic means spaced apart from said vibratory members for periodically developing a magnetic flux of sufficient strength to magnetically impart vibrational movement to said vibratory members.

* * * * *